United States Patent [19]

Ruemeli

[11] 4,099,344
[45] Jul. 11, 1978

[54] SHADING UNIT FOR PLANT PROPAGATION

[76] Inventor: Robert F. Ruemeli, 1411 N. Westshore Blvd. (114), Tampa, Fla. 33607

[21] Appl. No.: 621,138

[22] Filed: Oct. 9, 1975

[51] Int. Cl.² ............................................. A01G 13/00
[52] U.S. Cl. .......................................... 47/26; 47/31; 52/66; 135/5 R
[58] Field of Search ................... 47/26, 27, 28, 19, 17, 47/29, 31, 28 R; 52/71, 66; 135/5 R, 1 R

[56] References Cited

U.S. PATENT DOCUMENTS

| 796,461 | 8/1905 | Shimer | 47/26 UX |
|---|---|---|---|
| 898,341 | 9/1908 | Drake | 47/28 |
| 932,971 | 8/1909 | Drake | 47/28 |
| 932,972 | 8/1909 | Drake | 47/28 |
| 995,657 | 6/1911 | Bolt | 47/28 |
| 1,704,801 | 3/1929 | Miller | 47/30 |
| 2,326,548 | 8/1943 | Mierson | 47/29 |
| 2,608,726 | 9/1952 | Olson | 52/66 |
| 2,741,874 | 4/1956 | Denning | 47/28 |
| 2,836,860 | 6/1958 | Staropoli | 135/1 R |
| 2,890,498 | 6/1959 | Bigelow | 52/71 X |
| 3,788,016 | 1/1974 | Richardson | 52/66 |
| 3,874,114 | 4/1975 | Rowell | 47/19 X |

FOREIGN PATENT DOCUMENTS

| 633,808 | 2/1928 | France | 47/19 |
|---|---|---|---|
| 949,783 | 9/1956 | Fed. Rep. of Germany | 47/17 |
| 1,582,866 | 11/1969 | Fed. Rep. of Germany | 47/26 |
| 270,018 | 12/1929 | Italy | 47/17 |
| 115,251 | 5/1925 | Switzerland | 47/19 |
| 169,974 | 6/1934 | Switzerland | 47/19 |
| 419,000 | 11/1934 | United Kingdom | 47/29 |
| 4,469 of | 1896 | United Kingdom | 47/17 |
| 1,280,820 | 7/1972 | United Kingdom | 47/29 |
| 422,290 | 1/1935 | United Kingdom | 47/19 |

*Primary Examiner*—Edgar S. Burr
*Assistant Examiner*—Steven A. Bratlie
*Attorney, Agent, or Firm*—Robert F. Ruemeli

[57] ABSTRACT

A plant propagation unit has a continuous wall encircling the bed to protect the plants from high wind and dust, and is preferably spaced a short distance above the bed to permit escape of water from the bed and flow of air under the wall and upwardly through its open upper end. To facilitate tending the plants and bed, upper portions of the wall may be removable or hinged so that they can be swung downwardly to lower the overall height of the wall. A top spaced above the top of the wall and the bed facilitates ventilation of the bed and the plants therein, while protecting the plants from frost or intense midday sunlight as well as from heavy rainfall. While the top may be of any suitable type depending on the area in which the plants are being grown, it is preferably of a slightly open material, such as roll bamboo fencing, to permit a limited amount of sunlight and rain to enter the bed. The top is preferably removably hinged to uprights.

8 Claims, 3 Drawing Figures

SHADING UNIT FOR PLANT PROPAGATION

This invention relates to a plant protector and to propagation of plants and, more particularly, to propagation of cool-weather crops during hot weather.

BACKGROUND OF THE INVENTION

Various forms of plant protectors are shown in numerous patents, some of which resemble the currently popular "Hot Cap", as in U.S. Pat. No. 995,657, granted in 1911 in which a paper or wood veneer frusto-conical protector is spaced slightly above the ground and its open apex permits flow of air about the plant while protecting it from heavy winds and rain, as well as from extreme cold or heat. However, the opaque nature of this cover would not allow adequate sunlight to play on the plant. Additionally, the invention is not generally adaptable to protection for an entire bed. A somewhat similar "Ventilated Plant Shelter" is shown in U.S. Pat. No. 3,360,884, in which a ventilating tube extends from a closed upper end of a bag which is anchored to the ground for enclosing a plant. It appears questionable whether or not the plant would receive adequate ventilation and might be overheated. A "cloth house" shown in U.S. Pat. No. 2,051,643, is intended to cover many acres with a net like top and sides secured to a base board. Other than partially shading the plants, a structure of this type would have little if any effect in retaining cool air about the plants while permitting warm air to escape freely from the top of the structure. Another patent of passing interest is U.S. Pat. No. 3,812,616, in which a transparent, portable greenhouse has side walls which may be rolled up for tending the plants. However, permitting cool air about the plants with hot air rising from the bed area and escaping from the greenhouse is not provided.

Two patents granted to Drake of DeLand, Florida, early this century, U.S. Pat. No. 898,341, and U.S. Pat. No. 932,971, show structures for protecting cool weather crops and are of particular interest. The older patent shows a structure with one side wall and one end wall, the other side and end being open. Slats seated on the top edge of the end wall and atop bars provide some shelter from the sun, and a removable burlap cover can be extended across the slats. The slats are so far apart that protection from very intense sun would be ineffective, and a lack of a complete wall about the area would not retain cool air about the plants and would provide but limited wind protection. In the later patent, U.S. Pat. No. 932,971, the prior structure is modified by a complete wall about the area, but no ventilation is provided along the bottom of the wall. In both of the patents when a cover is applied over the bed, free discharge of hot air is limited if not prevented, but the cover is primarily a frost preventative.

It should further be noted that both cold frames and hot frames are intended for retaining seedlings and young plants adequately warm in cool weather, and while they generally have tops which may be opened for ventilation, there is generally no provision for retaining cool air around the plants while permitting warm air to rise and escape, but rather the intent and structure is the opposite of such function.

BRIEF DESCRIPTION OF THE INVENTION

The invention, in brief, is directed to plant propagation and a propagating unit. The unit has a substantially continuous side wall encircling a plant bed, the wall being of sufficient height in relation to the area of the bed for normally retaining cool air about the plants while permitting free escape of hot air above the side wall, and protecting the plants from high wind and blowing dust. A top may be releasably retained over the bed for sheltering the plants from intense midday sun and heavy rain, and is spaced sufficiently far above the top of the wall to permit free escape of hot air. A space is preferably provided at the bottom of the wall for permitting escape of excessive water from the bed and for permitting circulation of air about the plants to retard the formation of mildew and fungi, or the like. Preferably, upper portions of the wall may be removed or lowered for facilitating tending of the plants, and for permitting greater exposure of the plants to sunlight during relatively cool seasons and when the plants are small. Additionally, the top protects the bed and plants from frost, and may conveniently receive a flexible cover hanging downwardly therefrom to the wall for greater frost protection.

It is an object of this invention to provide a new and useful plant propagation unit. A related object is provision therein for encircling a bed of plants to a sufficient height in relationship to the area of the bed for effectively retaining a body of relatively cool air adjacent the bed and about the plants and covering the bed to protect the plants from intense sunlight while permitting escape of warm air upwardly from the bed. Still another related object is provision for ventilating the bed and the plants.

Another object is provision of a new and useful plant propagation unit for use with a garden bed, the unit including a substantially continuous side wall for encircling the bed, the wall being of sufficient height relative to the size of the bed for effectively retaining a body of relatively cool air adjacent the bed and about the plants growing therein, and a top normally positioned spaced above and extending across the top of the continuous wall. A related object is provision of the top being spaced sufficiently above the wall to facilitate escape of warm air upwardly from within the wall, while substantially retarding overhead sun from shining on the bed and the plants therein. Another related object is provision of the top being perforate and mounted for removal from the normal position extending across the top of the wall. Still another related object is provision of the wall being spaced above the bed to provide a gap therebetween. A further related object is provision of the gap between the bottom of the wall and the bed being of sufficient height to permit entry of air therethrough for ventilating the bed and the plants therein and permitting escape of excess water from the bed. A further related object is provision of the wall having a lower portion and an upper portion normally retained above the lower portion, the upper portion being mounted for removal from above the lower portion. A still further related object is provision of the upper portion of the wall being mounted for removal from the associated lower portion or, alternatively, being hinged to the associated lower portion to swing downwardly to a position along side the lower portion. A further related object is provision of the wall having opposite sides and ends, and uprights, one for each pair of adjacent sides and ends, the lower portions of the sides and ends being fixedly secured to the associted upright, and the top supported on upper portions of the uprights.

3

These and other objects and advantages of the invention will be apparent from the following description and the accompanying drawing.

DESCRIPTION OF THE ILLUSTRATED EMBODIMENTS

Figure 1:
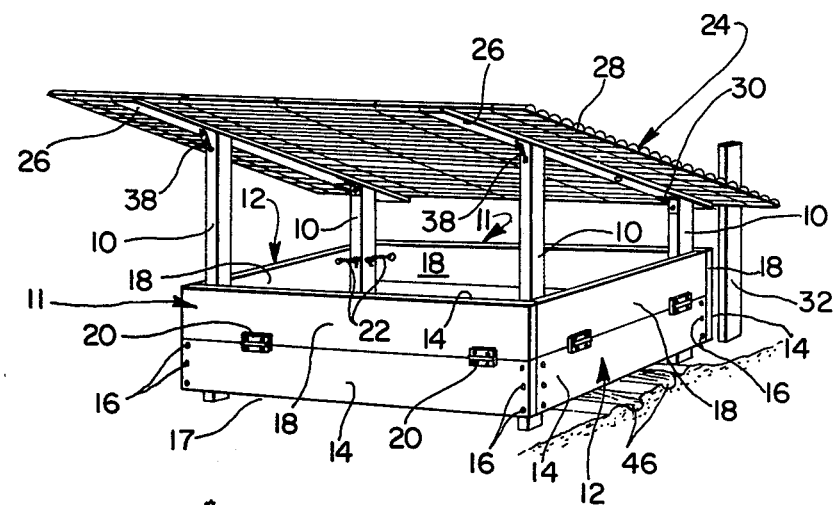
FIG. 1 is a perspective view of a plant propagation unit of this invention.

Referring to FIG. 1 of the drawing, the plant propagation unit is illustrated in the form of a rectangular unit having four corner uprights 10 of any suitable material such as wood, with a continuous wall including side walls 11 and end walls 12 of any suitable material such as wood, or hard board or paper board, or suitable metal or plastic, supported by the uprights 10. Each of the walls includes a lower portion 14 fixedly supported on the uprights in any suitable manner as by nails 16 with the bottom edges of the lower wall portions 14 being preferably supported slightly above the bottom ends of the uprights 10 to define a gap 17 between the bed and the wall. Alternatively, bottoms of the wall and uprights may be supported on blocks, or the like, to provide the gap. Upper wall portions 18 are secured by releasable hinges to the associated lower portions 14 to swing downwardly (FIG. 2), and may be secured in raised position (FIG. 1) in any suitable manner as by conventional screen door hooks and eyes 22.

Figure 2:
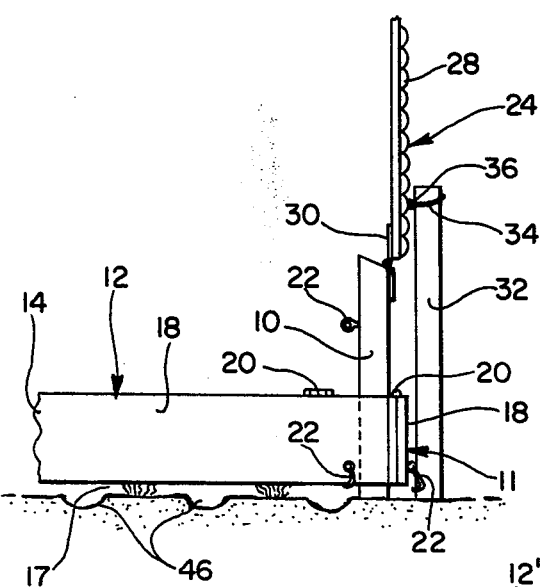
FIG. 2 is a fragmentary, enlarged side view of a rear portion of the unit shown in FIG. 1, but with a top in an open position, and upper portions of a continuous side wall hinged downwardly.

A top 24 is releasably retained atop the uprights 10 and is spaced an appreciable distance above the top edges of the upper wall portions 18 when in their elevated position. As illustrated herein, the top 24 comprises a pair of slats 26 with a suitable roofing, preferably perforate material such as a typical bamboo type fencing 28 secured to the slats 26 in any suitable manner as by wire or by additional slats (not shown) atop the roofing 28 and secured to the lower slats as by nails. As shown in FIG. 1, top 24 is pitched and overhangs the side walls 11 and the end walls 12. With reference to FIG. 2, the top 24 is shown in open position with preferably releasable hinges 30 securing the top to the uprights 10, and the top resting against a post 32 and secured thereto by a line 34 which may be secured to the top by an eye bolt 36 in the slat 26. In lowered position, the top rests against the higher uprights 10 and may be secured thereto in any suitable manner as by a typical screen door hook and eye 38 (FIG. 1) at the front uprights.

Figure 3:
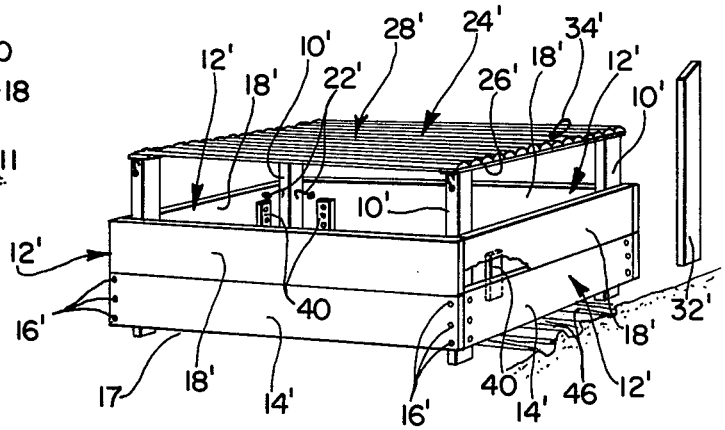
FIG. 3 is a perspective view of another embodiment of the propagation unit, but with a flat roof rather than the pitched roof as shown in the embodiment of FIGS. 1 and 2, and with the upper portions of the side walls removable from the lower portions rather than hinged thereto.

With reference to the embodiment shown in FIG. 3, similar reference numerals primed, as 10', refer to similar or identical parts as those described with reference to the unprimed reference numerals in FIGS. 1 and 2, and these parts will not necessarily be again described. In this embodiment a generally flat roof 28' is provided and is secured to the uprights 10' as previously described. The upper portions 18' of the side walls 11' and end walls 12' are releasably retained on the lower wall portions 14', each by a pair of slats 40 secured to inner faces of the upper portions 18°, one at each of opposite ends of the associated upper portion 18', to retain the upper portions against outward movement relative to the associated lower portions, with hooks and eyes 22' also retaining the upper portions in place, as previously described. Thus, the upper portions 18' can be completely removed from the unit, if desired.

A primary function of the continuous wall is to retain a body of cool air about the plants, and to this end the wall must be of sufficient height relative to the size of the bed. For example, if the space encompassed by the wall is 30 inches wide and 48 inches long, a wall having a height of about 2 feet is adequate, with the upper and lower portions of the wall each 1 foot in height. The gap 17 between the bed and the bottom edge of the wall of approximately 2 inches is generally adequate for ventilation and escape of water, while permitting the wall to protect the plants from high wind, and dust and debris blown by the wind, as well as effectively preventing entry of rabbits and other animals into the bed.

The top may be spaced any suitable distance above the top of the wall when the upper portion is in place above the lower portion, a distance of one foot generally being adequate although this distance may be increased to facilitate tending the bed, if desired. By provision of overhangs on the top, as shown in FIGS. 1 and 2, the distance between the top and the wall may be increased while protecting the plants from intense midday sunlight and the pitched top shown in FIGS. 1 and 2 provides easier access to the bed when the high part of the top faces north so that excess sunlight does not impinge on the plants.

A perforate top is preferable in that it admits some light while effectively shading the plants from intense midday sunlight. Additionally, a perforate top will permit some rainfall to enter the bed, while preventing a beating rain from damaging the plants. While a bamboo type top is adequate and of pleasing appearance, any form of perforate pressed board or waterproof paperboard, or the like, may be used in lieu of the bamboo type top and the perforations may be of any desired shape such as generally round holes or elongated slits, for example. A perforate area of ten to 25 percent is generally satisfactory depending on local climate and rainfall. The top may be opened between late afternoon and early morning hours, or at other times should the climate permit. With the upper portion of the wall in place on the lower portion the plants are adequately protected against strong winds since the height of the wall extends well above the normal height of the plants intended to be grown in the bed.

The bed may be of any desired length and of a width which will permit adequate tending of the plants with the upper portion of the wall removed so long as the bed is not so wide that the wall would have to be of too great a height to retain cool air about the plants. With a long bed, partitions should be provided between the side walls so that an adequate body of cool air will be retained about the plants. With long beds it may be desirable to provide a louver-type top which may be completely closed, with the louvers adjustable to provide entry of adequate sunshine and limited rainfall. Trenches, as 46, may be provided through the bed to facilitate watering the bed but not the portions of the plants above the bed, during very hot days, the water evaporating and cooling the plants.

While this invention has been described with reference to particular embodiments in a particular environment, various changes may be apparent to one skilled in the art and the invention is therefore not to be limited to such embodiments or environment, except as set forth in the appended claims.

What is claimed is:

1. A non-greenhouse type plant propagation unit for shading a garden bed, said unit including means for providing an environment generally cooler than the surrounding ambient conditions to facilitate the growth of plants during hot weather which plants such as lettuce for example, generally require a cooler environment; said means comprising a continuous substantially solid side wall means extending entirely around said bed and substantially to the tops of mature plants growing therein and a perforate, removably mounted top means formed on non-transparent materail extending across and vertically spaced above said side wall means for protecting the plants therein from intense sunlight and beating rain, said unit retaining a body of relatively cool air, with respect to the ambient atmospheric conditions, around the enclosed plants; support means extending below and supporting said side wall means and defining a gap beneath the bottom of said side wall means and the bottom of said support means to permit passage of air therethrough and drainage of water; post means spacing said top means above said side wall means and thereby defining a passage for air between the top of said side wall means and said top means; and securing means releaseably retaining said top means in normal operative position extending across said side wall means for covering the bed, whereby air may circulate freely about plants due to said gap and said passage.

2. A unit as set forth in claim 1 in which said side wall means has a lower portion, and an upper portion in normal operative position above said lower portion, and means mounting said upper portion for removal from above said lower portion.

3. A unit as set forth in claim 2 in which said side wall means has opposite ends and opposite sides, the lower portion of the ends and sides being operatively fixed relative to each other, and the mounting means mounts the upper portion of the ends and sides for removal from said normal operative position above the associated lower portion while leaving said top means in said normal operative position.

4. A unit as set forth in claim 3 including uprights, in which said support means and said post means comprise uprights one for each of adjacent ones of said ends and sides, the lower portion of said ends and sides being fixed to the associated upright, and said top when in said normal position is supported on upper end portions of said uprights.

5. A unit as set forth in claim 4 in which the supporting means includes portions of said uprights extending downwardly from the lower portion of said wall means.

6. A unit as set forth in claim 5 in which said top means is perforate with an open area of about ten to twenty-five percent.

7. A unit as set forth in claim 6 in which said mounting means releasably mounts said upper portion for removal from said normal operative position above said lower portion.

8. A unit as set forth in claim 6 in which said mounting means hingedly mounts said upper portion on said lower portion to swing downwardly from said normal operative position above said lower portion to a position alongside said lower portion.

* * * * *